June 30, 1964 YOSHIOKI ISHIKAWA ETAL 3,139,568
CAPACITOR HAVING A SEMI-CONDUCTIVE DIELECTRIC LAYER
Filed Nov. 7, 1961
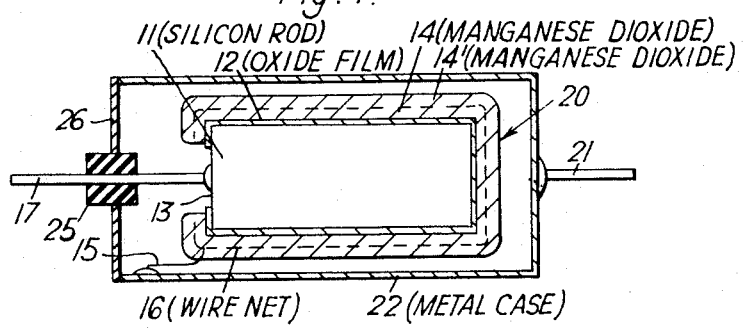
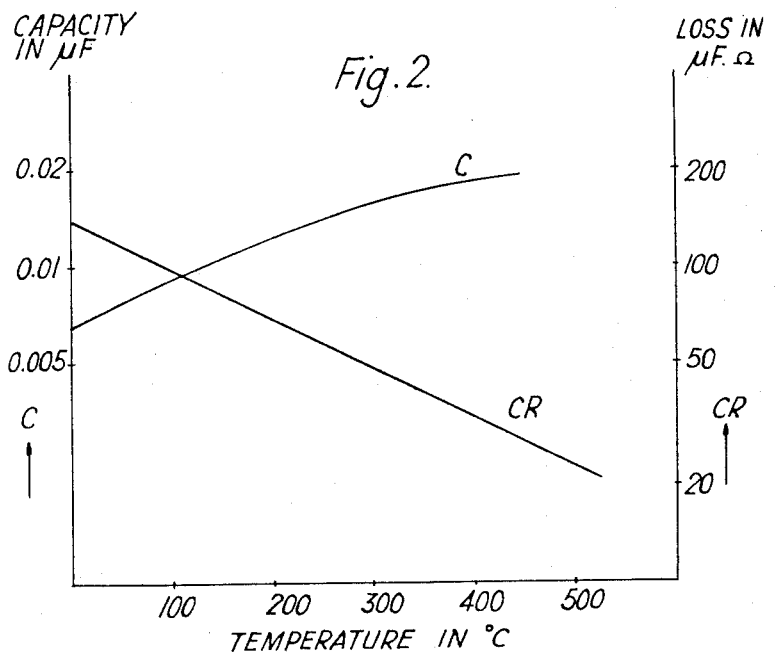
Inventors
Y. ISHIKAWA - Y. SASAKI -
S. INOWAKI
BY Arthur M. Lieberman
AGENT United States Patent Office
3,139,568
Patented June 30, 1964

3,139,568
CAPACITOR HAVING A SEMI-CONDUCTIVE DIELECTRIC LAYER
Yoshioki Ishikawa, Yozo Sasaki, and Shuichi Inowaki, all of Tokyo, Japan, assignors to Nippon Electric Company, Limited, Tokyo, Japan, a corporation of Japan
Filed Nov. 7, 1961, Ser. No. 150,772
Claims priority, application Japan Nov. 8, 1960
7 Claims. (Cl. 317—230)

This invention relates to a capacitor element utilizing as the dielectric an oxide film, obtained by oxidizing the surface of a semiconductor.

Conventional electrolytic capacitors have been made by anodizing a piece of metal, such as aluminium, tantalum, niobium, zirconium, titanium, or the like; providing a tenacious oxide film on the surface of the metal. A layer of an electrolyte, or semiconductor such as manganese dioxide is then brought into intimate contact with the oxide film. Thus by using the base metal covered with the oxide film as the anode, and by using a metal electrode brought into ohmic contact with the layer of the electrolyte or the semiconductor as the cathode the capacitor becomes functional. An electrolytic capacitor wherein the electrolyte is liquid is the conventional type; whereas, a capacitor in which a semiconductor is used instead of the electrolyte is called a solid electrolytic capacitor and may be found described in United States Patent No. 2,836,776.

The liquid electrolytic capacitor is serviceable at a temperature range from —150° C. to 150° C.; the boiling point and the freezing point of the electrolyte setting the comparatively small temperature range. Inasmuch as a solid electrolytic capacitor has no electrolyte, its serviceable temperature range is greater and is in a range from —200° C. to 200° C. The reasons why the solid electrolyte capacitor also has such a limited serviceable temperature range are, according to our experiments, as follows:

Inasmuch as the oxide film formed on the surface of the base metal piece has the construction of a p-i-n junction such as in a rectifier made of a semiconductor such as silicon or germanium, there is a strong electric field in the oxide film even when no voltage is applied thereto. Under the influence of this electric field, the atoms of the base metal are ionized, and these ions migrate into the oxide film, arriving on the surface of the oxide film which does not contact the base metal. Oxygen atoms, oxygen ions, or both are absorbed on this surface combining with the ions of the base metal which have arrived with the result that oxide film grows. The ion current ($I_{ion}$) caused by the migration of the metal ions is, when the base metal is tantalum for example, represented by the following equation:

$$I_{ion} = 20\lambda \mu q N \exp\{-(U+W/2)/kT\} \sinh(5q \cdot \lambda E/kT) \quad (1)$$

where $q$ is the electron charge; $\lambda$ is the half distance between the potential barriers for the movement of the base metal ions in the oxide film; $\mu$ is the frequency of the base metal ion which is at a lattice point neighboring a vacancy; $N$ is the number of the lattice points per unit volume of the oxide film; $U$ is the activation energy for the movement of the base metal ions; $W$ is the energy which is necessary for making a lattice defect of the Frenkel type in the oxide forming the oxide film, namely in the crystals of the ditantalum pentoxide in the instant case; $k$ is Boltzmann's constant; $T$ is the absolute temperature in degrees Kelvin; and $E$ is the electric field in the $i$-layer of the oxide film. The electric field $E$ can be approximated by the following equation:

$$E \approx (-\delta\varphi + \Delta\psi)/2d \quad (2)$$

where $-\delta\varphi$ is the potential applied from the exterior to the oxide film and is taken to be negative when the potential is applied to the p-i-n junction in the direction of hard flow; $\Delta\psi$ is the built-in voltage of the junction. According to our experiment, $q\Delta\psi$ is nearly equal to the free energy change of the film forming reaction $q$ v.$_{E.M.F.}$, and is 1.7 ev. in the case of tantalum oxide film, and $2d$ is the width of the $i$-layer. It is very unfavorable, as is well known, for such an ion current to flow in a capacitor, because a large ion current means small insulation resistance and a consequent decrease in the sharpness of resonance (Q). Also, the ion current, $I_{ion}$, thickens the oxide film as has been previously mentioned and consequently irreversibly decreases the capacity. Moreover, the ion current generates heat and causes a temperature rise which is obviously detrimental. As may be seen from Equation 1, the ion current is determined by the energy $U+W/2$, the strength of the electric field $E$ in the $i$-layer, and the temperature $T$. Furthermore, as may be seen from the Equation 2, the electric field $E$ is comparatively large even if the voltage applied from the exterior is small. Consequently, it is necessary to increase the energy $U+W/2$ in order to make it possible to use the capacitor at a high temperature $T$, or in order to make the ion current ($I_{ion}$) of the capacitor small at a high temperature. According to our experiments, however, it has been found that the energy $U+W/2$ in oxide films of metals obtained by way of anodic oxidation is usually comparatively small and is, for example, about 1.5 electronvolts in the anodic oxide film of tantalum which is a typical metal of a solid electrolytic capacitor. It was such small values of the energy $U+W/2$ in the anodic oxide film of the base metal that restricted the maximum serviceable temperature of a conventional solid electrolytic capacitor to 200° C.

In short, the reasons why it is impossible to raise the maximum serviceable temperature of the conventional solid electrolytic capacitor is, according to our experiment: that it is impossible to decrease the ion current due to the base metal ions which migrate in the oxide film; and that it is impossible to decrease the ion current in an anodic oxide film of a metal.

Hence, it is an object of this invention to provide a capacitor which is small in size yet of large capacity, cheap to manufacture, and which is stable at temperatures over 200° C.

As will be seen the object of the invention is satisfied by using a semiconductor as the base substrate and utilizing fact that the oxide film of the semiconductor has the large energy $U+W/2$, or the sum of the activation energy $U$ of the base semiconductor ions and half of the energy $W$ which is necessary to form, lattice defects of the Frenkel type in the film.

The above-mentioned and other features and objects of this invention and the manner of attaining them will become more apparent and the invention itself will be best understood by reference to the following description of an embodiment of the invention taken in conjunction with the accompanying drawings, in which:

FIG. 1 shows an axial cross section of a capacitor according to the invention; and FIG. 2 illustrates the characteristic curves of the capacitor shown in FIG. 1.

Referring to FIG. 1 which shows schematically an axial section of a preferred embodiment of this invention, the capacitor is made by first anodizing a base semiconductor piece or rod 11 of n-type silicon which has a specific resistance of less than 10 ohm-cm. and an effective surface area of 3 to 4 cm.² in a suitable electrolyte such as the ordinarily used sulfuric acid at 50 voltages to form an oxide film 12. It has been found convenient to coat a material such as wax on a part of the rod 11 before the anodic oxidation in order to facilitate formation of an exposed part 13, because this material can be more easily stripped off than the oxide film 12 or the conductive layer 14 which will be explained later. After thoroughly washing with water, the rod 11 coated with the oxide film 12, the rod 11 is immersed in a concentrated aqueous solution of manganese nitrate which is made by fusing the crystals of manganese nitrate and is heated up to about 300° C. Thereupon, a solid conductive layer 14 of manganese dioxide formed by thermal decomposition grows up tenaciously upon the oxide film 12. Electrode 16, consisting of a wire net, which is made of a solid conductive material, such as nickel, silver, gold, or platinum, and to which a cathode internal lead wire 15 of copper or other metal is preliminarily attached is then brought into ohmic contact with the conductive layer 14 by twining such electrode around the conductive layer 14. Another layer 14' of manganese dioxide is grown, as previously explained, and is thus also brought into ohmic contact with the electrode 16. Next, the part 13 is exposed by peeling the wax and an anode lead wire 17 of silver, gold, or platinum is attached thereto so as to contact ohmically with the rod 11. This may be accomplished, for example, by electroless nickel plating soldering, or winding the lead wire 17 around a projection which is preliminarily formed at the exposed part 13. The capacitor element 20 thus constructed is put into a metallic case 22 which has a cathode lead wire 21 at one end and is open at the other. The end of the cathode internal lead wire 15 which is not connected to the electrode 16 is electrically and mechanically bonded to the inner surface of the case 22 by solder or the like. Next, the open end of the case 22 is closed by a metallic lid 26 having an insulating ring 25 in the center thereof and the edge of the open end of the case 22 and the periphery of the lid 26 are sealed by way of soldering, metal welding, or the like.

FIG. 2 shows the capacity C and the loss CR of the capacitor as a function of temperature. Inasmuch as these values are substantially reversible in a temperature range between room temperature and 500° C., this capacitor is serviceable in this wide temperature range. The leakage current is less than $1/\mu a./v.\cdot/\mu f.$ in this temperature range. The value of CR is determined by the product of the electrostatic capacity C and the equivalent series resistance R of the capacitor.

Although in the embodiment described the base semiconductor substance was n-type silicon whose resistivity is less than 10 ohm-cm., an n-type silicon having specific resistance of more than 10 ohm-cm. can also be used. However, the equivalent series resistance of the capacitor will then somewhat increase and will result in a large loss. A small specific resistance, on the other hand, does not matter and the silicon may belong to the so-called degenerated semiconductor group. It is convenient to use n-type silicon because the surface can be oxidized by means of the anodic oxidation, but p-type silicon can also be used as the base material, because the surface thereof can be oxidized by means of oxidizing chemicals or heating in an oxidizing atmosphere, such as air. Moreover, any semiconductor material on the surface of which it is possible to form an oxide film by way of surface oxidation can also be used. However, a better result will be obtained if a semiconductor material which is so stable that the oxide film, or more precisely the oxide layer involving the $i$-layer, does not crack and which has an energy $U+W/2$, of more than 1.5 electron volts, is used.

In the embodiment described a rod having an effective surface area of 3 to 4 cm.$^2$ was used as the base semiconductor piece. The effective surface area is not limited by this value, since it only affects the capacitor's capacity together with the other factors. The shape of the element may also vary and may be either plate of foil. In case silicon is used, the piece may be either single crystal or polycrystal, it may be a plate or rod obtained by machining them, or it may be shape obtained by sintering after pressure-molding the silicon powder. Furthermore, in the embodiment described, manganese dioxide was used for the solid conductive layer, but this layer may be made of lead dioxide or other solid conductive materials. Also, the outer solid conductive layer may be eliminated in the interest of expediency and the inner solid conductive layer surround by a net-shaped or helix shaped electrode. Electrode 16 can be formed, not only in a net or wire-form, but also in a plate or a foil form with any metal other than nickel, silver, gold, and platinum, or the same material as that of the solid conductive layer. Furthermore, either or both the case and the lid can be made of an insulating material, and the cathode internal lead wire 15 may be taken out through the case or the lid to be used at the cathode lead wire 21. Where a metallic case is used, molten solder or impregnation of an insulating material may be placed in the case prior to putting in the capacitor element 20 with a view toward fixing the element 20 in the case. Also, any passage of air between the inner space of the case and the outside, such as the space between the anode lead wire 17 and the insulator 25 may be eliminated by filling the space between the capacitor element 20 and the capacitor housing, or the case 22 and the lid 26, with dry air or oxygen and then hermetically sealing the capacitor.

The capacitor element of this invention, especially one using silicon as the base semiconductor material, performs stably at a temperature in excess of 500° C., particularly because the sum $U+W/2$ (of the activation energy U for the base semiconductor ions in the oxide film and a half of the energy W which is necessary for making the Frenkel type lattice defect) is 3.0 electron volts compared to 1.5 electron volts at maximum in the case of tantalum, the conventional base metal in solid electrolytic capacitors. Moreover, the capacitor element according to the invention will perform at temperatures up to 750° C. if the strength of the electric field E in the oxide film is one-tenth of the strength of the electrical field $E_0$ (the field necessary for sufficiently forming the oxide film at 200° C.) since the ion migration is negligible. Where manganese dioxide is used as the solid conductive layer, the capacitor is only serviceable up to 500° C. if it is also used at a temperature as low as 200° C. This is because manganese dioxide changes to manganese sesquioxide at 530° C. at the atmospheric pressure with the result that the equivalent series resistance greatly increases when the temperature is lowered below 200° C.

Silicon is advantageous as the base semiconductor material, because the purity and shape of the base semiconductor piece are not critical and because it is not necessary to use a single crystal of highly pure silicon which is very expensive. Further the capacitor element of this invention retains the chief advantage of an electrolytic capacitor, i.e., small size and large capacity. Where an electrolyte having a high boiling point, such as a concentrated sulfuric acid solution of potassium sulfate is used in place of the solid conductive layer, the capacitor will be very cheap and yet perform up to the boiling point of the electrolyte which is quite high. Running tests now in progress, have shown no change in a capacitor, made according to this invention, after more than 1000 hours at 500° C.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. In a capacitor the combination comprising: an anode formed of a semi-conductive material, a dielectric oxide film of said semi-conductive material covering a majority of the surface of said anode, a layer of conductive, oxidizing material in intimate contact with the external surface of said dielectric film, a first electrode in intimate contact with said layer of conductive, oxidizing material and a second electrode in intimate contact with said anode at a point not embraced by said dielectric film.

2. A capacitor as set forth in claim 1 wherein the semiconductive material is silicon.

3. A capacitor as claimed in claim 1 in which a majority of said first electrode is disposed within said layer of conductive material.

4. A capacitor as claimed in claim 3 in which said majority is in the form of a net.

5. A capacitor as claimed in claim 1 in which said layer of conductive material manganese dioxide.

6. A capacitor as claimed in claim 1 in which said layer of conductive material is lead dioxide.

7. A capacitor as claimed in claim 1 further comprising a hermetically sealed metal case surrounding the recited elements through which and insulated from the first electrode protrudes and to which the second electrode is electrically connected.

References Cited in the file of this patent
UNITED STATES PATENTS

| | | |
|---|---|---|
| 1,661,703 | Ogden | Mar. 6, 1928 |
| 2,541,832 | Quinn | Feb. 13, 1951 |
| 3,054,029 | Wagner | Sept. 11, 1962 |